(12) United States Patent
Chiu et al.

(10) Patent No.: US 10,277,057 B2
(45) Date of Patent: Apr. 30, 2019

(54) MOBILE MEDICATION WORKSTATION AND METHOD FOR SUPPLYING POWER THEREOF

(71) Applicant: ADVANTECH CO., LTD., Taipei (TW)

(72) Inventors: Sheng-Yuh Chiu, Taipei (TW); Chih-Hui Wang, Taipei (TW); Yu-Lun Chien, Nantou County (TW); Chi-Chien Hsu, Taipei (TW)

(73) Assignee: ADVANTECH CO., LTD., Taipei (TW)

(*) Notice: Subject to any disclaimer, the term of this patent is extended or adjusted under 35 U.S.C. 154(b) by 248 days.

(21) Appl. No.: 15/248,400

(22) Filed: Aug. 26, 2016

(65) Prior Publication Data

US 2018/0062414 A1  Mar. 1, 2018

(51) Int. Cl.
| | |
|---|---|
| *A61G 12/00* | (2006.01) |
| *A61J 7/00* | (2006.01) |
| *H02J 50/12* | (2016.01) |
| *H02J 50/40* | (2016.01) |
| *H02J 50/80* | (2016.01) |

(Continued)

(52) U.S. Cl.
CPC .......... *H02J 7/025* (2013.01); *A61G 12/001* (2013.01); *H02J 7/0027* (2013.01); *H02J 7/0054* (2013.01); *H02J 50/10* (2016.02); *H02J 50/12* (2016.02); *H02J 50/40* (2016.02); *H02J 50/80* (2016.02); *H02J 50/90* (2016.02); *A61G 12/008* (2013.01)

(58) Field of Classification Search
USPC .................................................. 307/31, 104
See application file for complete search history.

(56) References Cited

U.S. PATENT DOCUMENTS

| 7,116,200 B2 | 10/2006 | Baarman et al. |
| 2010/0290215 A1 | 11/2010 | Metcalf et al. |
| | (Continued) | |

FOREIGN PATENT DOCUMENTS

| TW | 200950257 A | 12/2009 |
| TW | M419329 U1 | 12/2011 |

(Continued)

*Primary Examiner* — Rexford N Barnie
*Assistant Examiner* — Xuan Ly
(74) *Attorney, Agent, or Firm* — Li & Cai Intellectual Property (USA) Office

(57) ABSTRACT

A mobile medication workstation comprises a platform module and a battery module. The battery module is disposed on the platform module. The platform module has an article placing platform and an accommodating portion. The platform has an article containing area. The accommodating portion is used to accommodate a storage box. The mobile medication workstation comprises a first wireless charging module and a second wireless charging module. The first wireless charging module is electrically connected to the battery module and is close to the placing goods area. The second wireless charging module is electrically connected to the battery module and is close to the storage box. When a handheld device is placed in the article containing area, the first wireless charging module supplies power to the handheld device, and when the storage box is placed in the accommodating portion, the second wireless charging module supplies power to the storage box.

13 Claims, 6 Drawing Sheets

(51) Int. Cl.
*H02J 50/90* (2016.01)
*H02J 7/00* (2006.01)
*H02J 7/02* (2016.01)
*H02J 50/10* (2016.01)

(56) References Cited

U.S. PATENT DOCUMENTS

2015/0365138 A1* 12/2015 Miller .................... H02J 5/005
 307/104
2016/0006992 A1* 1/2016 Roberts ................. H04N 7/185
 348/113
2016/0045398 A1 2/2016 Lai et al.

FOREIGN PATENT DOCUMENTS

| TW | M435260 U1 | 8/2012 |
| TW | M510005 U | 10/2015 |
| TW | M515227 U | 1/2016 |
| TW | 201605429 A | 2/2016 |
| TW | 201616766 A | 5/2016 |

* cited by examiner

MOBILE MEDICATION WORKSTATION AND METHOD FOR SUPPLYING POWER THEREOF

BACKGROUND

1. Technical Field

The present disclosure relates to a mobile medication workstation and a method for supplying power thereof, in particular, to a mobile medication workstation and a method for supplying power thereof which is adapted for medical utilization.

2. Description of Related Art

Effective healthcare management and telecare service have become important factors in current medical developments because of aging population and sub-replacement fertility rate. In such a case, the mobile medication workstation mounted on the nursing cart and disposed with the medical apparatus for displaying the patient's medical history, medication administration and drug dosage of the patient and the equipment used to measure the patient's physiological value plays a critical role of nursing care. The nursing staff can do the nursing care in the ward using the mobile medication workstation, thereby providing the patient with the quality medical service.

However, the medical apparatus for displaying the patient's medical history, medication administration and drug dosage of the patient and the equipment used to measure the patient's physiological value and so on consume a lot of electricity because they are used repeatedly and frequently, causing that the nursing staff cannot use the devices until the electrical capacity is sufficiently available or the battery is replaced. Under these circumstances, the conventional mobile medication workstation cannot be used advantageously.

SUMMARY

In view of this, an exemplary embodiment of the present disclosure provides a mobile medication workstation and a method for supplying power thereof which uses two wireless charging modules to respectively supply power to the handheld device and the storage box, thereby promoting the usability of the mobile medication workstation.

According to one exemplary embodiment of the present disclosure, a mobile medication platform is provided, including a platform module and a battery module. The battery module is disposed on the platform module. The platform module includes an article placing platform and an accommodating portion. The article placing platform has an article containing area, and the accommodating portion is used to accommodate a storage box. The mobile medication workstation includes a first wireless charging module and a second wireless charging module. The first wireless charging module is electrically connected to the battery module and is close to the article containing area. The second wireless charging module is electrically connected to the battery module and is close to the storage box. When a handheld device is placed in the article containing area, the first wireless charging module supplies power to the handheld device. When the storage box is placed in the accommodating portion, the second wireless charging module supplies power to the storage box.

According to another exemplary embodiment of the present disclosure, a mobile medication platform is provided, including a platform module, a battery module, a first wireless charging module and a second wireless charging module. The platform module includes an article placing platform and an accommodating portion. The article placing platform has an article containing area, and the accommodating portion is used to accommodate a storage box. The battery module is disposed on the platform module. The first wireless charging module is electrically connected to the battery module and is close to the article containing area. The second wireless charging module is electrically connected to the battery module and is close to the storage box. When a handheld device is placed in the article containing area, the first wireless charging module supplies power to the handheld device. When the storage box is placed in the accommodating portion, the second wireless charging module supplies power to the storage box.

According to one exemplary embodiment of the present disclosure, a method for supplying power to a mobile medication workstation adapted to a mobile medication workstation is provided, and the mobile medication workstation includes a platform module, a battery module, a first wireless charging module and a second wireless charging module. The platform module includes an article placing platform and an accommodating portion. The article placing platform has an article containing area, and the accommodating portion is used to accommodate a storage box. The first wireless charging module is electrically connected to the battery module and is close to the article containing area. The second wireless charging module is electrically connected to the battery module and is close to the storage box. The method includes the steps: the first wireless charging module determining whether a handheld device is placed in the article containing area, when the handheld device has been determined in the article containing area, the first wireless charging module supplies power to the handheld device; and the second wireless charging module determining whether the storage box is in the accommodating portion, when the storage box has been determined in the accommodating portion, the second wireless charging module supplies power to the storage box.

According to another exemplary embodiment of the present disclosure, a method for supplying power to a mobile medication workstation adapted to a mobile medication workstation is provided, and the mobile medication workstation includes a platform module, a battery module, a first wireless charging module and a second wireless charging module. The battery module is disposed on the platform module. The platform module includes an article containing platform and an accommodating portion. The article containing area has an article containing area, and the accommodating portion is used to accommodate a storage box. The first wireless charging module is electrically connected to the battery module and is close to the article containing area. The second wireless charging module is electrically connected to the battery module and is close to the storage box. The method includes the steps: the first wireless charging module determining whether a handheld device is placed in the article containing area, when the handheld device has been determined in the article containing area, the first wireless charging module supplies power to the handheld device; and the second wireless charging module determining whether the storage box is placed in the accommodating portion, when the storage box has been determined in the accommodating portion, the second wireless charging module supplies power to the storage box.

To sum up, the present disclosure provides a mobile medication workstation and a method for supplying power thereof which uses two wireless charging modules to respectively supply power to the handheld device and the storage box. When the handheld device is placed in the article containing area, the first wireless charging module supplies power to the handheld device. When the storage box is combined with the accommodating portion of the platform module, the second wireless charging module supplies power to the storage box, thereby maintaining the basic operation of the storage box. Thus the mobile medication workstation and the method for supplying power thereof provided by the present disclosure can simplify the wiring arrangement of the mobile medication workstation to enable the mobile medication workstation to be used more advantageously.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
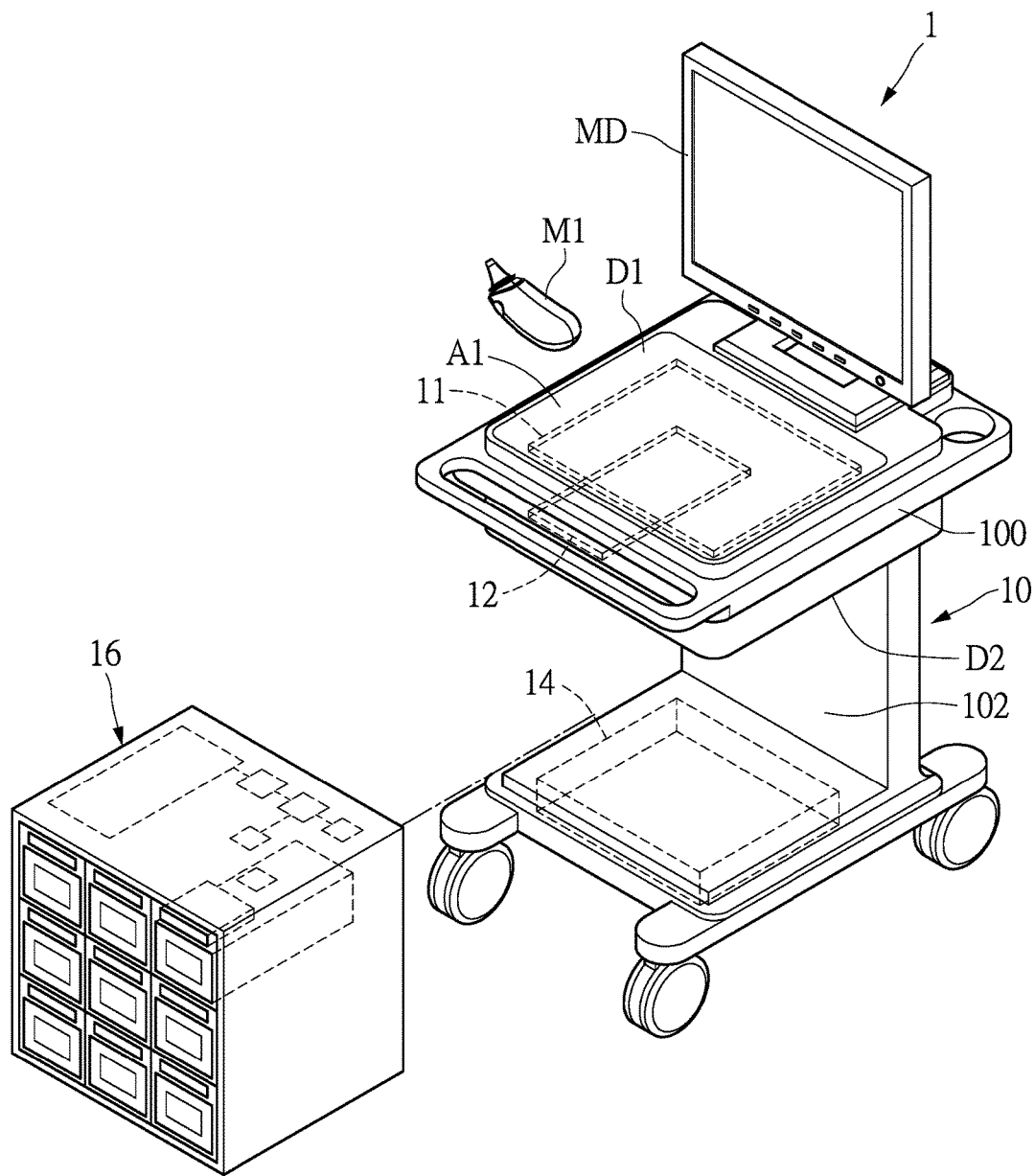
FIG. 1 is a three-dimensional diagram of one embodiment of the mobile medication workstation of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Please refer to FIG. 1 which is a three-dimensional diagram of one embodiment of the mobile medication workstation of the present disclosure. As shown in the figure, a mobile medication workstation 1 includes a platform module 10 and a battery module 14. The battery module 14 is disposed on the platform module 10. The platform module 10 is disposed with an article containing area A1 and an accommodating portion 102. The accommodating portion 102 is used to accommodate a storage box 16. In addition, the mobile medication workstation 1 includes a first wireless charging module 11 and a second wireless charging module 12.

In practice, the mobile medication workstation 1 may be a medication cart, a nursing cart, or the other medication workstations. The platform module 10 includes a platform, a frame, a support and a wheelset which are disposed on a medication cart, a nursing cart, or the other medication workstation. An article placing platform 100 is disposed close to the handle of the platform module 10, and the article containing area A1 is disposed on the article placing platform 100.

The battery module 14 may be a lead-acid battery, a nickel-zinc battery, a nickel-iron battery, or a lithium battery. As shown in FIG. 1, the battery module 14 is disposed below the platform module 10 and close to the wheelset. The accommodating portion 102 is disposed between the article placing platform 100 and the wheelset and used to accommodate the storage box 16. That is, the storage box 16 is detachably disposed in the accommodating portion 102, and alternatively, the storage box 16 is combined with the accommodating portion 102 of the platform module 10.

The mobile medication workstation 1 of the present disclosure is disposed with two wireless charging modules. One wireless charging module is used to charge or supply power to a handheld device M1 placed in the article containing area A1, wherein the handheld device M1 may be an ear thermometer, a forehead thermometer, a blood glucose meter, a smartphone, a tablet, a PDA, an electronic device, equipment used to measure a patient's physiological value, or other nursing devices. The other wireless charging module is used to charge or supply power to the storage box 16. The storage box 16 may be a smart pill storage chest, a storage case, a first-aid kit, or the other cases. However, the handheld device M1 and the storage box 16 of the present disclosure are not limited thereto.

To be more precise, the first wireless charging module 11 is electrically connected to the battery module 14 and close to the article containing area A1. The second wireless charging module 12 is electrically connected to the battery module 14 and close to the storage box 16. When the handheld device M1 is placed in the article containing area A1, the first wireless charging module 11 charges or supplies power to the handheld device M1. When the storage box 16 is placed in the accommodating portion 102, the second wireless charging module 12 charges or supplies power to the storage box 16.

In addition, the article containing area A1 is disposed with a sensing unit D1. When the sensing unit D1 senses the handheld device M1, the sensing unit D1 outputs a sensing signal to the first wireless charging module 11 to activate the first wireless charging module 11. Here, the sensing unit D1 may be a touch sensor, a weight sensor, a pressure sensor, or the other sense switches. When the handheld device M1 is placed in the article containing area A1, the sensing unit D1 senses the handheld device M1 and then activates the first wireless charging module 11.

In the other embodiments, when the first wireless charging module 11 is in the standby mode or resting state, the handheld device M1 can actively pair with the first wireless charging module 11 to activate the first wireless charging module 11. For example, when the handheld device M1 outputs a power supply requirement signal to the first wireless charging module 11, the first wireless charging module 11 is activated to supply power to the handheld device M1 when it receives the power supply requirement signal.

The accommodating portion 102 and the storage box 16 may be connected with each other by clamping, coupling, a track, or other fastening mechanisms. The accommodating portion 102 is disposed with a detecting unit D2. When the accommodating portion 102 and the storage box 16 are connected with each other, the detecting unit D2 outputs a detecting signal to the second wireless charging module 12 to activate the second wireless charging module 12. Here, the detecting unit D2 may be a touch sensor, a weight sensor, a pressure sensor, and alternatively, a clamping mechanism, a coupling mechanism, a track, or the other fastening mechanisms.

In the other embodiments, when the second wireless charging module 12 is in the standby mode or resting state, the second wireless charging module 12 can actively pair with the storage box 16 by a second communication unit (not shown) to activate the storage box 16. For example, when the second wireless charging module 12 outputs a power supply requirement signal to the storage box 16, the storage box 16 is activated to receive the power supplied by the second wireless charging module 12 when it receives the power supply requirement signal. The mobile medication workstation 1 of the present disclosure is not limited thereto.

Figure 2:
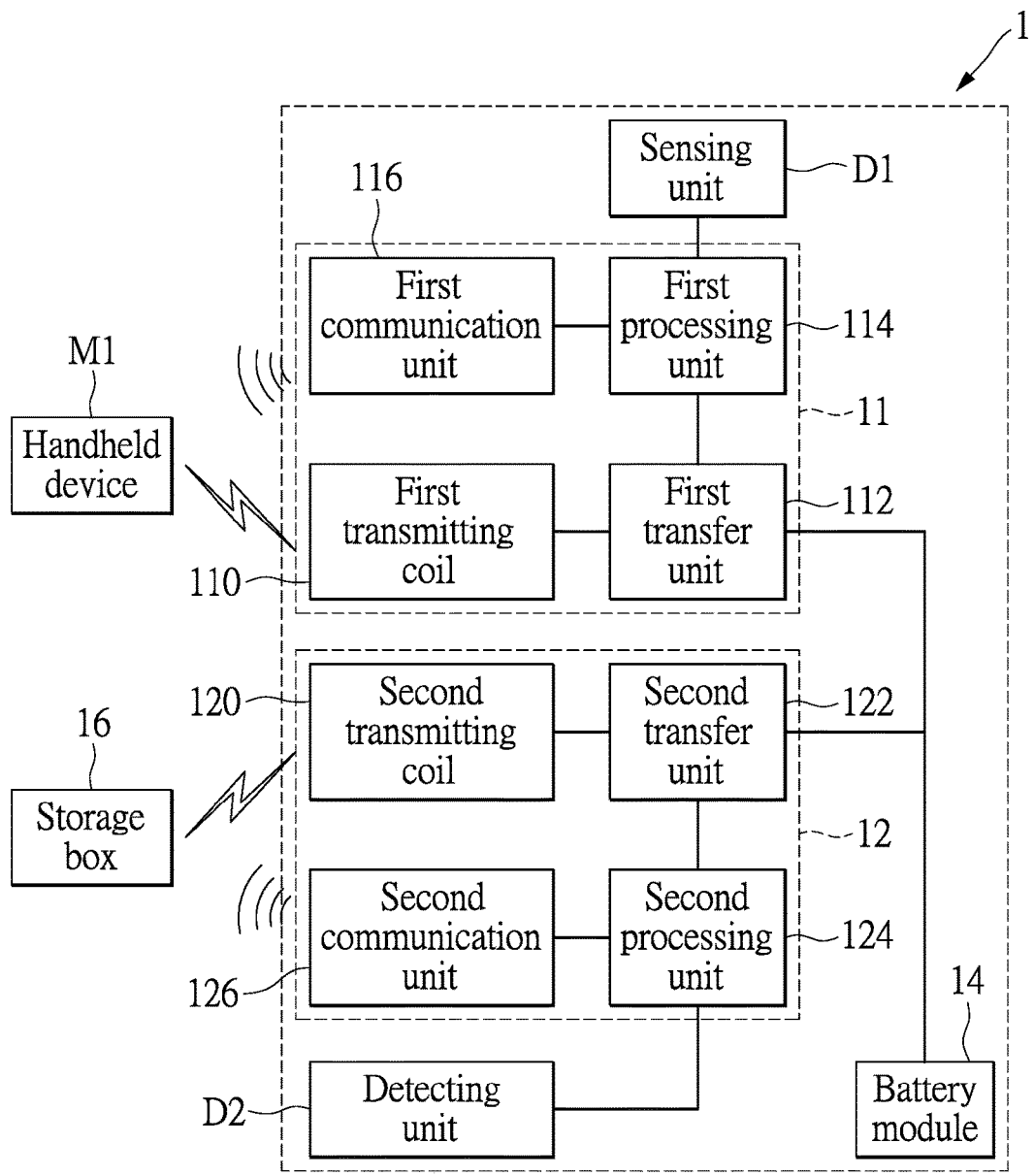
FIG. 2 is a block diagram of the other embodiment of the mobile medication workstation of the present disclosure.

Please refer to FIG. 2 which is a block diagram of the other embodiment of the mobile medication workstation of the present disclosure. As shown in the figure, the first wireless charging module 11 includes a first transmitting coil 110, a first transfer unit 112, a first processing unit 114 and a first communication unit 116. The first transmitting unit 110 is electrically connected to the first transfer unit 112. The first processing unit 114 is electrically connected to the first transfer unit 112 and the first communication unit 116. The first transfer unit 112 is electrically connected to the battery module 14.

The second wireless charging module 12 includes a second transmitting coil 120, a second transfer unit 122, a second processing unit 124 and a second communication unit 126. The second transmitting unit 120 is electrically connected to the second transfer unit 122. The second processing unit 124 is electrically connected to the second transfer unit 122 and the second communication unit 126. The second transfer unit 122 is electrically connected to the battery module 14.

The first transmitting coil 110 and the second transmitting coil 120 may be an induction coil or an electromagnetic induction line, and can wirelessly transmit electrical energy in the form of induction or resonance. In addition, the first transmitting coil 110 and the second transmitting coil 120 may be a DC-AC conversion circuit, a driving circuit, a magnetic resonance resonant circuit, an electromagnetic induction conversion circuit, or other circuit. The first communication unit 116 and the second communication unit 126 are used to transmit and exchange data or to communicate by Bluetooth communication, radio frequency communication, Wi-Fi, or other communication methods. The first processing unit 114 and the second processing unit 124 may be a processor, a microprocessor, a control circuit of a semiconductor electronic component, a processing circuit, or a deciding circuit.

The sensing unit D1 shown in FIG. 1 is electrically connected to the first processing unit 114. When the sensing unit D1 senses the handheld device M1, the first processing unit 114 is activated to control the first communication unit 116 to pair with the handheld device M1. In addition, the first processing unit 114 controls the first transfer unit 112 and the first transmitting coil 110 to supply power to the handheld device M1.

The detecting unit D2 shown in FIG. 1 is electrically connected to the second processing unit 124. When the detecting unit D2 detects the storage box 16, the second processing unit 124 is activated to control the second communication unit 126 to pair with the storage box 16. In addition, the second processing unit 124 controls the second transfer unit 122 and the second transmitting coil 120 to supply power to the storage box 16.

The first communication unit 116 is used to pair with the handheld device M1 and to receive the power supply requirement. The second communication unit 126 is used to pair with the storage box 16 and to receive the power supply requirement. In practice, when the handheld device M1 outputs a power supply requirement signal to the first communication unit 116, the first communication unit 116 notifies the first processing unit 114 to enable the first processing unit 114 to control the first transfer unit 112 to drive the first transmitting coil 110, thereby enabling the first wireless charging module 11 to supply power to the handheld device M1.

Similarly, when the storage box 16 outputs a power supply requirement signal to the second communication unit 126, the second communication unit 126 notifies the second processing unit 124 to enable the second processing unit 124 to control the second transfer unit 122 to drive the second transmitting unit 120, thereby enabling the second wireless charging module 12 to supply power to the storage box 16.

Figure 3:
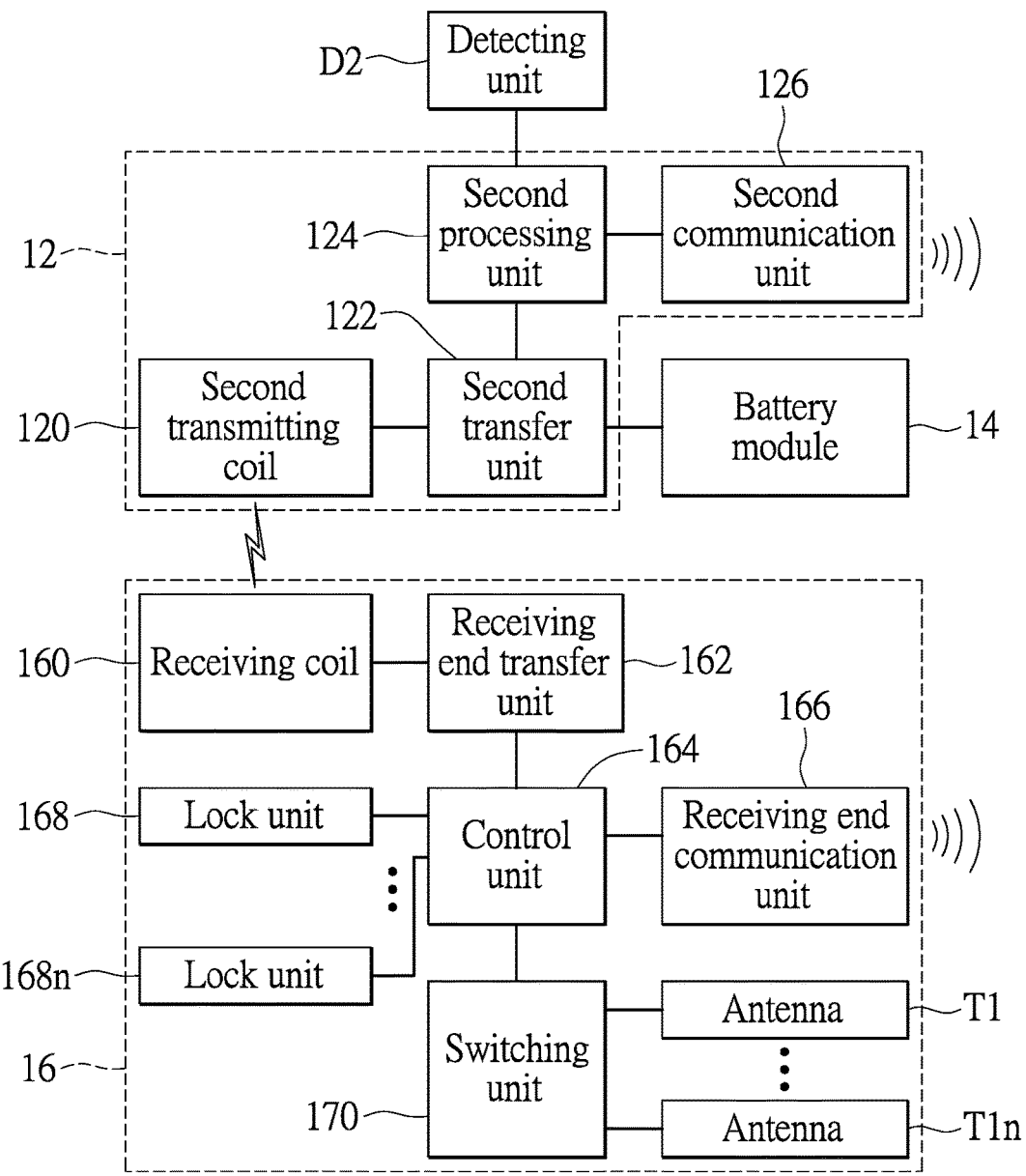
FIG. 3 is a block diagram illustrating how the second wireless charging module and the storage box of the mobile medication workstation of the present disclosure work.
Figure 4:
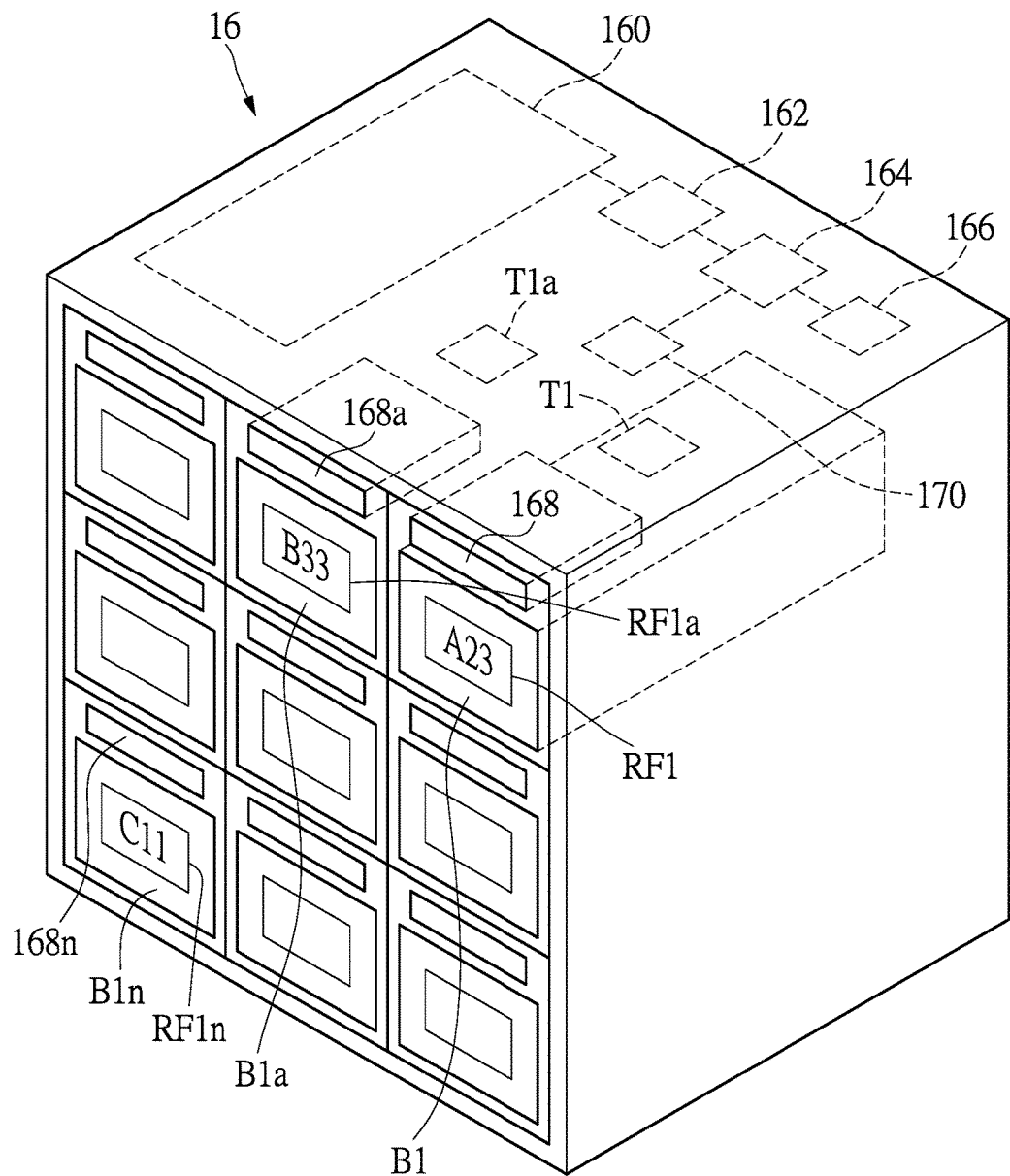
FIG. 4 is a three-dimensional diagram of the other embodiment of the storage box of the present disclosure.

Please refer to FIG. 3 and FIG. 4 together, wherein FIG. 3 is a block diagram illustrating how the second wireless charging module and the storage box of the mobile medication workstation of the present disclosure work and FIG. 4 is a three-dimensional diagram of another embodiment of the storage box of the present disclosure. For better understanding, the storage box 16 is a smart pill storage chest.

The smart pill storage chest is disposed with a receiving coil 160, a receiving end switching unit 162, a control unit 164, a receiving end communication unit 166, a plurality of pill boxes B1, B1a, B1n, a plurality of lock units 168, 168a, 168n, a switching unit 170, and a plurality of antennas T1, T1a, T1n.

The receiving coil 160 is electrically connected to the receiving end switching unit 162. The control unit 164 is electrically connected to the receiving end switching unit 162, the receiving end communication end 166, the plurality of lock units 168, 168a, 168n and the switching unit 170. Each of the plurality of lock units 168, 168a, 168n is used to lock or unlock each of the plurality of pill boxes B1, B1a, B1n correspondingly. The switching unit 170 is electrically connected to the plurality of antennas T1, T1a, T1n.

For better understanding, there are 9 (3×3) pill boxes B1, B1a, B1n used as an example in the present embodiment. Each of the plurality of lock units 168, 168a, 168n may be an electronic lock, a switch lock, or other lock structure. Here, an amount of the pill boxes B1, B1a, B1n is equal to an amount of the lock units 168, 168a, 168n, an amount of the wireless tags RF1, RF1a, RF1n, and an amount of the antennas T1, T1a, T1n. In the other embodiments, an amount of the pill boxes may be 2 (1×2), 16 (4×4), or other amount.

The receiving coil 160 may be an induction coil or an electromagnetic induction line, and can work in the form of induction or resonance. In addition, the receiving end switching unit 162 may be an AC-DC conversion circuit, a driving circuit, a magnetic resonance resonant circuit, an electromagnetic induction conversion circuit, or other circuit. The receiving end communication unit 166 is used to transmit and exchange data or to communicate by Bluetooth communication, radio frequency communication, Wi-Fi, or the other communication methods. The control unit 164 may be a processor, a microprocessor, a control circuit of the semiconductor electronic component, a processing circuit, or a deciding circuit.

The switching unit 170 is electrically connected to the control unit 164 and used to switch the plurality of antennas T1, T1a, T1n. The plurality of antennas T1, T1a, T1n read the data of the wireless tags RF1, RF1a, RF1n correspondingly, and then the obtained data is provided to the control unit 164. In practice, the switching unit 170 may be a switching circuit, a change-over switching circuit, or a change-over switch. When the switching unit 170 switches the antenna T1 from the antenna T1a, the antenna T1a is electrically connected to the switching unit 170. After that, the antenna T1a electrically connected to the switching unit 170 reads the wireless tag RF1a corresponding to the antenna T1a, and then the read data of the wireless tag RF1a is provided to the control unit 164.

The identification data is the code of the wireless tags RF1, RF1a, RF1n, wherein the code may be the identity code of the wireless tags RF1, RF1a, RF1n or the user-defined management code. The contents of the wireless tags RF1, RF1a, RF1n are related to the information about the identification data, and in particular, to the readable data for the user, such as the patient's name, the medication administration and drug dosage of the patient, and the other private information. Here, the contents of the wireless tags RF1, RF1a, RF1n are the data which is necessary to the administrator. In addition, the administrator can use the management data as the contents of the wireless tags RF1, RF1a, RF1n according to the actual requirements, thereby increasing the efficiency of a data search. For example, when the antennas T1, T1a, T1n of the smart pill storage chest reads the identification data of the wireless tags RF1, RF1a, RF1n, the smart pill storage chest provides the contents respectively corresponding to the identification data of the wireless tags RF1, RF1a, RF1n to the user.

For example, the medicines of the patients A, B, C are respectively stored in the pill boxes B1, B1a, B1n, and the pill boxes B1, B1a, B1n respectively correspond to the wireless tags RF1, RF1a, RF1n of A23, B33, C11. When the nursing staff uses the mobile medication workstation 1 to do the nursing care to the patient B in the ward, the nursing staff can scan the patient's code by a scanner to obtain the medical history and medical information of the patient B.

After that, a motherboard (not shown) of the mobile medication workstation 1 outputs indication information to the control unit 164 of the smart pill storage chest according to the medication information of the patient B. The control unit 164 reads the wireless tags RF1, RF1a, RF1n by the switching unit 170 and the plurality of antennas T1, T1a, T1n and then finds the wireless tag RF1a of B33 which matches the medical information of the patient B. Next, the control unit 14 controls the lock unit 168a to unlock the pill box B1a to enable the nursing staff to get the medicine stored in the pill box B1a.

Here, the motherboard is electrically connected to the first wireless charging module 11 and the second wireless charging module 12. The motherboard is for example electrically connected to the first processing unit 114 and the second processing unit 124. In the other embodiments, the motherboard, the first processing unit 114 and the second processing unit 124 can be formed integrally as a circuit board, thereby decreasing the connection lines disposed among the motherboard, the first wireless charging module 11 and the second wireless charging module 12. In addition, the motherboard can also be electrically connected to the scanner, the other equipment used to measure the patient's physiological value, and so on, and the present disclosure does not limit the aspect of the mother board.

The motherboard wirelessly transmits the indication information to the receiving end communication unit 166 of the storage box 16 by the second communication unit 126. When the receiving end communication unit 166 receives the indication information, the receiving end communication unit 166 transmits the indication information to the control unit 164 to activate the control unit 164. Thus the control unit 164 can find the positions of the wireless tags RF1, RF1a, RF1n by the switching unit 170 and the plurality of the antennas T1, T1a, T1n.

If the smart pill storage chest does not have sufficient power or receive the indication information, the lock units 168, 168a, 168n of the smart pill storage chest are locked. Hence the nursing staff is incapable of opening any of the pill boxes B1, B1a, B1n. However, as the smart pill storage chest is disposed with a manual unlock unit (not shown), the nursing staff can manually unlock the lock units 168, 168a, 168n of the smart pill storage chest by the manual unlock unit if necessary. Here, the manual unlock unit may be a compulsory unlock mechanism.

In order to rapidly obtain the data of the wireless tags RF1, RF1a, RF1n to unlock the corresponding lock units 168, 168a, 168n, the switching unit 170 and the plurality of antennas T1, T1a, T1n are used as an example in the present embodiment. In the other embodiments, the smart pill storage chest can use an antenna to read the data of the plurality of wireless tags RF1, RF1a, RF1n.

In the other embodiments, the smart pill storage chest may include a storage unit (not shown), an inquiry unit (not shown) and a prompting unit (not shown), wherein the storage unit, the inquiry unit and the prompting unit are respectively electrically connected to the control unit 164. For example, the storage unit is used to store the identification data and/or the contents of the wireless tags RF1, RF1a, RF1n. Thus the control unit 164 can find the identification data and/or the contents of the wireless tag RF1, RF1a, RF1n stored in the storage unit according to the indication information, and then confirm the positions of the pill boxes B1, B1a, B1n according to the antennas T1, T1a, T1n.

The inquiry unit may be an interface which provides the user a way to input the inquiry information in the form of text or voice. For example, the user can input the keyword of the content to be inquired or the information about the wireless tag RF1, RF1a, RF1n such as the words tagged on the wireless tags RF1, RF1, RF1n by the inquiry unit. The inquiry unit includes a display screen used to display information and an input keyboard used to input text.

The promoting unit is used to output a prompt signal for prompting the positions of the antennas T1, T1a, T1n, and may be an indicator light, a display panel or an audio output device. The prompt signal such as the indicator light, textual information or voice information is used to prompt the user to notice the positions of the antennas T1, T1a, T1n, thereby enabling the user to obtain the medicine stored in the pill boxes of the wireless tags RF1, RF1a, RF1n corresponding to the antennas T1, T1a, T1n. The present disclosure does not limit the aspect of the smart drug storage chest.

Figure 5:
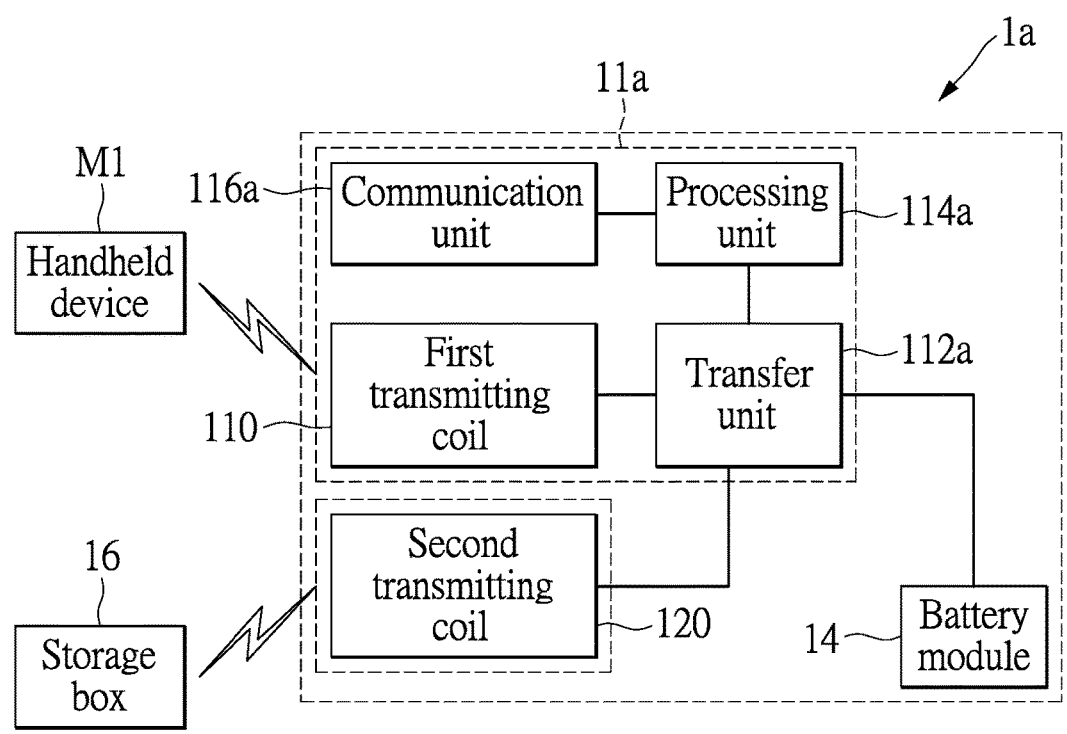
FIG. 5 is a block diagram of the other embodiment of the mobile medication workstation of the present disclosure.

Please refer to FIG. 5 which is a block diagram of another embodiment of the mobile medication workstation of the present disclosure. The first wireless charging module 11a and the second wireless charging module 12a shown in FIG. 5 and the first wireless charging module 11 and the second wireless charging module 12 shown in FIG. 2 are basically similar to each other. However, the difference is that in the present embodiment, the first wireless charging module 11a includes the first transmitting coil 110, the transfer unit 112a, the processing unit 114a and the communication unit 116a. The first transmitting coil 110 is electrically connected to the transfer unit 112a. The processing unit 114a is electrically connected to the transfer unit 112a and the communication unit 116a. The transfer unit 112a is electrically connected to the battery module 14. The second wireless charging module 12a includes the second transmitting coil 120, and the second transmitting coil 120 is electrically connected to the transfer unit 112a.

That is, the transfer unit 112a, the processing unit 114a and the communication unit 116a of the second wireless charging module 12a are shared with the first wireless charging module 11a. The communication unit 116a is used to pair with the handheld device M1 and to receive the power supply requirement, and to pair with the storage box 16 and to receive the power supply requirement. The transfer unit 112a transfers the direct current outputted by the battery module 14 into the power source that meets the power supply requirement of the first transmitting coil 110 and the second transmitting coil 120.

In the other embodiments, the second wireless charging module may be formed of the second transmitting coil 120 and the second communication unit 126, the second transmitting coil 120 and the second transfer unit 122, or the second transmitting coil 120, the second transfer unit 122 and the second communication unit 126. The first wireless charging module and the second wireless charging module can be made according to the actual requirements, and the present disclosure is not limited thereto.

Figure 6:
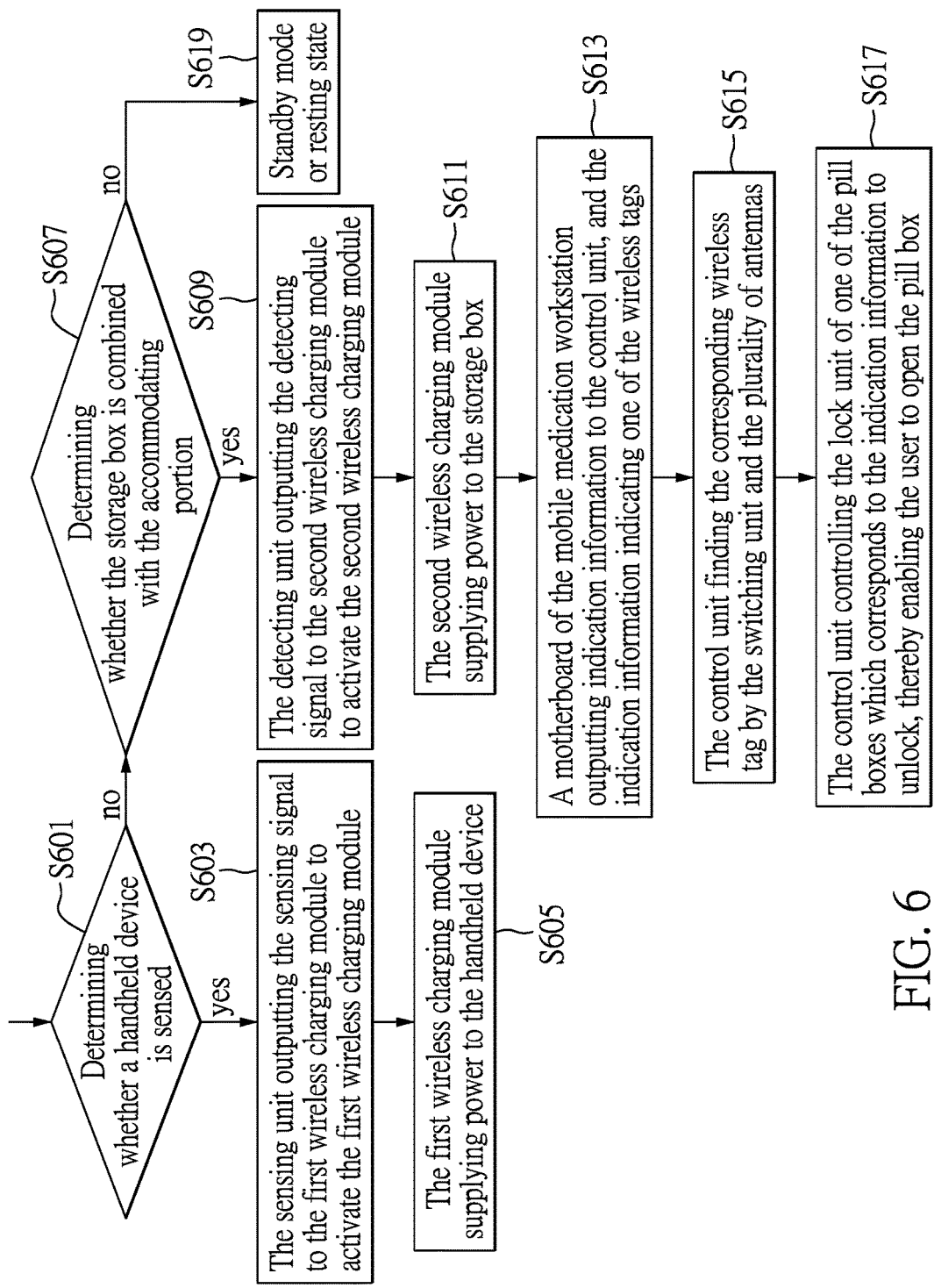
FIG. 6 is a flow chart of the other embodiment of the method for supplying power to the mobile medication workstation of the present disclosure.

Please refer to FIG. 6 which is a flow chart of the other embodiment of the method for supplying power to the mobile medication workstation of the present disclosure. As shown in the figure, a method for supplying power to a mobile medication workstation is adapted to a mobile medication workstation, wherein the mobile medication platform includes a platform module, a battery module, a first wireless charging module and a second wireless charging module. The battery module is disposed on the platform module. The platform module includes an article placing platform and an accommodating portion. The article placing platform has an article containing area, and the accommodating portion is used to accommodate a storage box. The first wireless charging module is electrically connected to the battery module and is close to the article containing area. The second wireless charging module is electrically connected to the battery module and is close to the storage box. The method includes the following steps.

In S601: determining whether a handheld device is sensed. If a handheld device is sensed, it enters S603. In S603: the sensing unit outputting a sensing signal to the first wireless charging module to activate the first wireless charging module. After that, it enters S605. In S605: the first wireless charging module supplying power to the handheld device.

In the other embodiments, the first wireless charging module is used to determine whether the handheld device is sensed in S601 and S603. For example, the first wireless charging module determines whether the handheld device is placed in the article containing area. When the handheld device has been determined to be in the article containing area, the first wireless charging module supplies power to the handheld device.

Here, the first wireless charging module is used to determine whether a handheld device is sensed based on whether or not the first communication unit receives a power supply requirement of the handheld device.

When a handheld device is not sensed in S601, it enters S607. S607 is determining whether the storage box is combined with the accommodating portion. When the storage box has been determined to be combined with the accommodation portion, it enters S609. In S609, the detecting unit outputs a detecting signal to the second wireless charging module to activate the second wireless charging module. After that, it enters S611. In S611, the second wireless charging module supplies power to the storage box.

In the other embodiments, the second wireless charging module is used to determine whether the storage box is combined with the accommodating portion in S607 and S609. For example, the second wireless charging module determines whether the storage box is placed in the accommodating portion. If the storage box has been determined to be in the accommodating portion, the second wireless charging module supplies power to the storage box. Here, the second wireless charging module is used to determine whether the storage box is combined with the accommodating portion based on whether or not the second communication unit receives a power supply requirement of the storage box.

In S613, a motherboard of the mobile medication workstation outputs indication information to the control unit and the indication information is used to indicate one of the wireless tags. The motherboard is disposed in the mobile medication workstation. In practice, when the nursing staff uses the mobile medication workstation to do the nursing care to the patient in the ward, for example, using the code scanner to scan the patient's code to obtain the medical history, the motherboard also obtains the patient's medical information, and then the control unit controls the lock unit of the pill box, which corresponds to the patient's medication information, to unlock. That is, the motherboard outputs the indication information to the control unit according to the patient's medical information.

In S615, the control unit finding the corresponding wireless tag according to the switching unit and the plurality of antennas. In practice, the control unit reads the wireless tag by the plurality of antennas, and switches the plurality of antennas by using the switching unit. When the patient's wireless tag medical information read by the antenna matches the indication information, the control unit obtains the position of the pill box of the wireless tag.

In S617, the control unit controls the lock unit of one of the pill boxes, which corresponds to the indication information, to unlock, thereby enabling the user to open the pill box. In practice, the control unit controls the lock unit to unlock according to the wireless tag and the indication information, so that the nursing staff can obtain the medication administration and drug dosage of the patient to do the nursing care.

When the storage box is not determined to be combined with the accommodating portion in S607, it enters S619, meaning that the wireless charging modules are in the standby mode or resting state. That is, when the handheld device or the storage box is not sensed, the first wireless charging module and the second wireless charging module of the present embodiment enters the standby mode or resting state to save power.

In summary, the present disclosure provides a mobile medication workstation which uses two wireless charging modules to respectively supply power to the handheld device and the storage box. When the storage box and the accommodating portion of the platform module are combined, the second wireless charging module supplies power to the storage box, thereby maintaining the basic operation of the storage box. When the motherboard of the mobile medication workstation outputs the indication information to the control unit, the control unit controls one of the lock units to unlock according to the indication information, thereby enabling the nursing staff to obtain the medicine of the patient. In addition, when the first wireless charging module and the second wireless charging module are in the standby mode or resting state and the receiving end communication unit of the storage box wirelessly receives the indication information, the control unit is used to scan the wireless tag by the plurality of antennas, thereby saving time and power and rapidly finding the corresponding pill box, so that the mobile medication workstation can be used more advantageously.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A mobile medication workstation, comprising: a platform module and a battery module, wherein the battery module is disposed on the platform module, the platform module comprises an article placing platform and an accommodating portion, the platform has an article containing area, and the accommodating portion is used to accommodate a storage box, and the mobile medication workstation further comprising:
    a first wireless charging module electrically connected to the battery module and positioned close to the article containing area; and
    a second wireless charging module electrically connected to the battery module and positioned close to the storage box;
    wherein when a handheld device is placed in the article containing area, the first wireless charging module supplies power to the handheld device; and when the storage box is placed in the accommodating portion, the second wireless charging module supplies power to the storage box, wherein the first wireless charging module comprises a first transmitting coil, a transfer unit, a processing unit and a communication unit the first transmitting coil is electrically connected to the transfer unit, the processing unit is electrically connected to the transfer unit and the communication unit, the transfer unit is electrically connected to the battery module; and the second wireless charging module comprises a second transmitting coil, and the second transmitting coil is electrically connected to the transfer unit.

2. The mobile medication workstation according to claim 1, wherein the second wireless charging module comprises a second processing unit and a second communication unit, the second processing unit is electrically connected to the second communication unit.

3. The mobile medication workstation according to claim 2, wherein the first communication unit is used to pair with the handheld device and to receive a power supply requirement of the handheld device; the second communication unit is used to pair with the storage box and to receive a power supply requirement of the storage box; and the transfer unit is one of a DC-AC conversion circuit, a driving circuit, a magnetic resonance resonant circuit, or a combination thereof.

4. The mobile medication workstation according to claim 1, wherein the communication unit is used to pair with the handheld device and to receive a power supply requirement of the handheld device, the communication unit is used to pair with the storage box and to receive a power supply requirement of the storage box, and the transfer unit is a one of a DC-AC conversion circuit, a driving circuit, a magnetic resonance resonant circuit, or a combination thereof.

5. The mobile medication workstation according to claim 1, wherein the article containing area is disposed with a sensing unit, the sensing unit is electrically connected to the first wireless charging unit; when the sensing unit senses the handheld device, the sensing unit outputs a sensing signal to the first wireless charging unit to activate the first wireless charging unit, and the sensing unit is a touch sensor, a weight sensor, a pressure sensor, or a button.

6. The mobile medication workstation according to claim 1, wherein the accommodating portion is disposed with a detecting unit, the detecting unit is electrically connected to the second wireless charging unit; when the storage box is combined with the accommodating portion, the detecting unit outputs a detecting signal to the second wireless charging unit to activate the second wireless charging unit, and the detecting unit is a touch sensor, a weight sensor, a pressure sensor, a clamping mechanism, a coupling mechanism, a track, or other fastening mechanisms.

7. The mobile medication workstation according to claim 1, wherein the storage box is a smart pill storage chest, and the smart pill storage chest is disposed with a receiving coil, a receiving end switching unit, a control unit, a receiving end communication unit, a plurality of pill boxes, and a plurality of lock units; the receiving coil is electrically connected to the receiving end switching unit, the control unit is electrically connected to the receiving end switching unit, the receiving end communication unit and the plurality of lock units, and each of the plurality of lock units locks or unlocks each of the plurality of pill boxes correspondingly.

8. The mobile medication workstation according to claim 7, wherein the storage box comprises a switching unit, a plurality of antennas and a plurality of wireless tags, the switching unit is electrically connected to the control unit, each of the plurality of antennas is electrically connected to the switching unit, each of the plurality of wireless tags is correspondingly disposed to each of the plurality of pill boxes, and each of the plurality of antennas reads each of plurality of the wireless tags correspondingly.

9. The mobile medication workstation according to claim 7, wherein when the smart pill storage chest is combined with the storage box, the second wireless charging module supplies power to the smart pill storage chest and the control unit; a motherboard of the mobile medication workstation outputs indication information to the control unit, the indication information is used to indicate one of the plurality of wireless tags, the control unit finds the corresponding wireless tag by the switching unit and the plurality of antennas, and the control unit controls the lock unit of one of the pill boxes which corresponds to the indication information to unlock, thereby enabling the user to open the pill box.

10. A mobile medication workstation, comprising:
    a platform module having an article placing platform and an accommodating portion, wherein the article placing platform has an article containing area, and the accommodating portion is used to accommodate a storage box;
    a battery module disposed on the platform module;

a first wireless charging module electrically connected to the battery module and close to the article containing area; and a second wireless charging module electrically connected to the battery module and close to the storage box;

wherein when a handheld device is placed in the article containing area, the first wireless charging module supplies power to the handheld device; and when the storage box is placed in the accommodating portion, the second wireless charging module supplies power to the storage box; wherein the first wireless charging module comprises a first transmitting coil, a first transfer unit, a first processing unit and a first communication unit; the first transmitting coil is electrically connected to the first transfer unit, the first processing unit is electrically connected to the first transfer unit and the first communication unit, and the first transfer unit is electrically connected to the battery module; and the second wireless charging module comprises a second transmitting coil, a second transfer unit, a second processing unit and a second communication unit, the second transmitting coil is electrically connected to the second transfer unit, the second processing unit is electrically connected to the second transfer unit and the second communication unit, and the second transfer unit is electrically connected to the battery module.

11. A method for supplying power to a mobile medication workstation adapted to a mobile medication workstation, and the mobile medication workstation comprising: a platform module, a battery module, a first wireless charging module and a second wireless charging module; wherein the battery module is disposed on the platform module, the platform module comprises an article placing platform and an accommodating portion, the article placing platform has an article containing area, the accommodating portion is used to accommodate a storage box, the first wireless charging module is electrically connected to the battery module and is close to the article containing area, and the second wireless charging module is electrically connected to the battery module and is close to the storage box, and the method comprising the steps:

the first wireless charging module determining whether a handheld device is placed in the article containing area, when the handheld device has been determined to be in the article containing area, the first wireless charging module supplying power to the handheld device, and the second wireless charging module determining whether the storage box is in the accommodating portion, when the storage box has been determined in the accommodating portion, the second wireless charging module supplying power to the storage box, wherein the article containing area is disposed with a sensing unit, the sensing unit is electrically connected to the first wireless charging module, and the method comprises the steps:

when the sensing unit senses the handheld device, the sensing unit outputting a sensing signal to the first wireless charging module to activate the first wireless charging module.

12. The method for supplying power to a mobile medication workstation according to claim 11, wherein the accommodating portion is disposed with a detecting unit, the detecting unit is electrically connected to the second wireless charging module, and the method comprises the steps:

when the storage box is combined with the accommodating portion, the detecting unit outputting a detecting signal to the second wireless charging module to activate the second wireless charging module.

13. The method for supplying power to a mobile medication workstation according to claim 12, wherein the storage box is a smart pill storage chest, the smart pill storage chest comprises a control unit, a switching unit, a plurality of pill boxes, a plurality of lock units, a plurality of antennas and a plurality of wireless tags; the control unit is electrically connected to the switching unit and the plurality of lock units, each of the plurality of lock units locks or unlocks each of plurality of the pill boxes correspondingly, each of the plurality of antennas reads each of plurality of the wireless tags correspondingly, and the step of the second wireless charging module supplying power to the storage box comprises:

a motherboard of the mobile medication workstation outputting indication information to the control unit, and the indication information indicating one of the plurality of wireless tags;

the control unit finding the corresponding wireless tag by the switching unit and the plurality of antennas; and the control unit controlling the lock unit of one of the pill boxes, which corresponds to the indication information, to unlock, thereby enabling the user to open the pill box.

* * * * *